US012680689B2

(12) United States Patent
Lin

(10) Patent No.: US 12,680,689 B2
(45) Date of Patent: Jul. 14, 2026

(54) EASY-TO-WEAR EYELASH EXTENSION LAMP

(71) Applicant: Guangdong Kuaimei Technology Industry Co., Ltd, Dongguan (CN)

(72) Inventor: Zeyu Lin, Dongguan (CN)

(73) Assignee: Guangdong Kuaimei Technology Industry Co., Ltd, Dongguan (CN)

( * ) Notice: Subject to any disclaimer, the term of this patent is extended or adjusted under 35 U.S.C. 154(b) by 102 days.

(21) Appl. No.: 18/777,866

(22) Filed: Jul. 19, 2024

(65) Prior Publication Data

US 2024/0365900 A1 Nov. 7, 2024

(30) Foreign Application Priority Data

Jun. 19, 2024 (CN) ......................... 202421401153.2

(51) Int. Cl.
*F21V 33/00* (2006.01)
*A45D 44/00* (2006.01)

(52) U.S. Cl.
CPC .......... *F21V 33/0004* (2013.01); *A45D 44/00* (2013.01); *F21V 33/0084* (2013.01); *A45D 2200/10* (2013.01)

(58) Field of Classification Search
CPC ... F21V 33/004; F21V 33/0084; A45D 44/00; A41G 5/02
See application file for complete search history.

(56) References Cited

U.S. PATENT DOCUMENTS

2007/0024997 A1* 2/2007 Neal ...................... A61B 17/30 359/844
2010/0078088 A1* 4/2010 Navarro ................. A45D 44/22 132/216
2016/0316840 A1* 11/2016 Yang ........................ A41G 5/02
2017/0340041 A1 11/2017 Nguyen
2020/0390173 A1* 12/2020 Yang ................... F21V 33/0084
2021/0120899 A1 4/2021 Zimmer
2023/0189912 A1 6/2023 Dewey et al.
2025/0009058 A1* 1/2025 Bonhill .................... A41G 5/02

* cited by examiner

*Primary Examiner* — Tracie Y Green
*Assistant Examiner* — Michael Chiang
(74) *Attorney, Agent, or Firm* — Hemisphere Law, PLLC

(57) ABSTRACT

The present disclosure discloses an easy-to-wear eyelash extension lamp, including a base box; a remote control receiving electronic circuit is arranged inside the base box; the remote control receiving electronic circuit inside the base box is connected to a remote control foot switch; an upper surface of the base box is connected to a light-emitting diode (LED) lamp; the LED lamp uses a 410 mm nano LED; a charging port is provided on one side of the base box; the charging port is connected to a battery through a wire; and a tweezer is arranged below the base box.

7 Claims, 6 Drawing Sheets

EASY-TO-WEAR EYELASH EXTENSION LAMP

TECHNICAL FIELD

The present disclosure relates to the technical field of lamps for eyelash extension, and in particular, to an easy-to-wear eyelash extension lamp.

BACKGROUND

Eyelash extension means using glue to connect treated simulated eyelashes to the original eyelashes, causing the original eyelashes to grow. Based on the shape of the eyes, well-defined and lifelike eyelashes can be designed, making the eyes bright and radiant without makeups. These false eyelashes can make the eyes bright and attractive. In a process of eyelash extension, one end of the false eyelashes needs to be quickly glued, and the false eyelashes are then adhered to the original eyelashes. A dedicated lamp is used to irradiate the glue for quick curing.

Due to a small volume of the eyelashes, a tweezer is required during the operation. In order to cooperate with the tweezer, the tweezer is combined with an eyelash lamp to make a tweezer lamp. The existing tweezer lamp has low universality and is not suitable for replacing tweezers with different sizes. This affects the universality of the device.

SUMMARY

The present disclosure aims to provide an easy-to-wear eyelash extension lamp. In this device, an elastic clip is fixedly mounted below a tweezer lamp. The elastic clip is used to clamp and fix different tweezers to solve the problems in the above background section.

To achieve the above objectives, the present disclosure provides the following technical solution: An easy-to-wear eyelash extension lamp includes a base box; a remote control receiving electronic circuit is arranged inside the base box; the remote control receiving electronic circuit inside the base box is connected to a remote control foot switch; an upper surface of the base box is connected to a light-emitting diode (LED) lamp; the LED lamp uses a 410 nm nano LED; a charging port is provided on one side of the base box; the charging port is connected to a battery through a wire; a tweezer is arranged below the base box; a clamping structure is arranged on a lower surface of the base box; and the clamping structure is provided with an elastic clip to clamp and fix the tweezer.

Preferably, the clamping structure includes the elastic clip; the elastic clip is made of a stainless steel material; two clamping plates with different lengths are arranged below the elastic clip; a cross section of one clamping plate of the elastic clip is L-shaped; upper ends of the two clamping plates of the elastic clip are connected to a surface of the same connector; and a cross section of the elastic clip is of a hollow T-shaped structure.

By the adoption of the above technical solution, the elastic clip can be used to clamp and fix the tweezer.

Preferably, two magnets are symmetrically arranged on an upper surface of the battery.

By the adoption of the above technical solution, the magnets on the surface of the battery can be used to suck the tweezer and the base box to the wrist of a user.

Preferably, a wearing structure is arranged below the base box; and the wearing structure is provided with a cloth bag configured to store the battery and facilitate the device to be worn on the wrist of an operator.

By the adoption of the above technical solution, due to the use of the wearing structure, the device can be quickly worn on the wrist of a user.

Preferably, the wearing structure includes the cloth bag; the cloth bag is made of an elastic material; one side of the cloth bag is of an open structure; the open side of the cloth bag is sewn and connected with a bag cover; connecting buttons are separately arranged on a surface of the bag cover and a surface of the cloth bag; and the connecting buttons are of press button structures.

By the adoption of the above technical solution, the cloth bag and the bag cover can be used to store the battery.

Preferably, a wire opening is provided on a surface of the cloth bag; the wire opening is a circular hole penetrating through the surface of the cloth bag; and an elastic rope structure is arranged on an inner wall of the wire opening.

By the adoption of the above technical solution, the wire opening on the surface of the cloth bag can be used to connect a wire with the battery.

Preferably, one side of the cloth bag is sewn and connected with a connecting strap I, and the other side of the cloth bag is sewn and connected with a connecting strap II; the connecting strap I and the connecting strap II both use the same elastic fabric as the cloth bag; three adjustment buttons are arranged on a surface of the connecting strap I in parallel; and a plurality of groups of parallel elongated button holes are provided on a surface of the connecting strap II.

By the adoption of the above technical solution, the device can be worn on the wrist of a user through the connection between the connecting strap I and the connecting strap II.

Compared with the prior art, the easy-to-wear eyelash extension lamp has the beneficial effects below:

1. In the device, the elastic clip is fixedly mounted on the lower surface of the base box; the elastic clip forms a hollow T-shaped structure through the two clamping plates; one edge of the tweezer is inserted between the two clamping plates of the elastic clip, which can fix the tweezer below the base box for easy storage of the tweezer; and due to the elastic clip, different tweezers can be quickly replaced.
2. The device is provided with the wearing structure. The main body portion of the wearing structure includes the cloth bag and the bag cover. The bag cover and the surface of the cloth bag can be connected and opened by using the connecting buttons, so that it is convenient to store the battery into the cloth bag. The magnets are arranged on the surface of the battery, so that when the device is not in use, the device can be directly magnetically sucked onto the wrist.
3. In the device, the connecting strap I and the connecting strap II are arranged on the two sides of the cloth bag. The adjustment buttons are arranged on the surface of the connecting strap I and are connected to the button holes on the surface of the connecting strap II. The plurality of groups of parallel button holes can be used to adjust the connection lengths of the connecting strap I and the connecting strap II, so that the device can be worn on the wrists of users with different body types.

Figure 1:
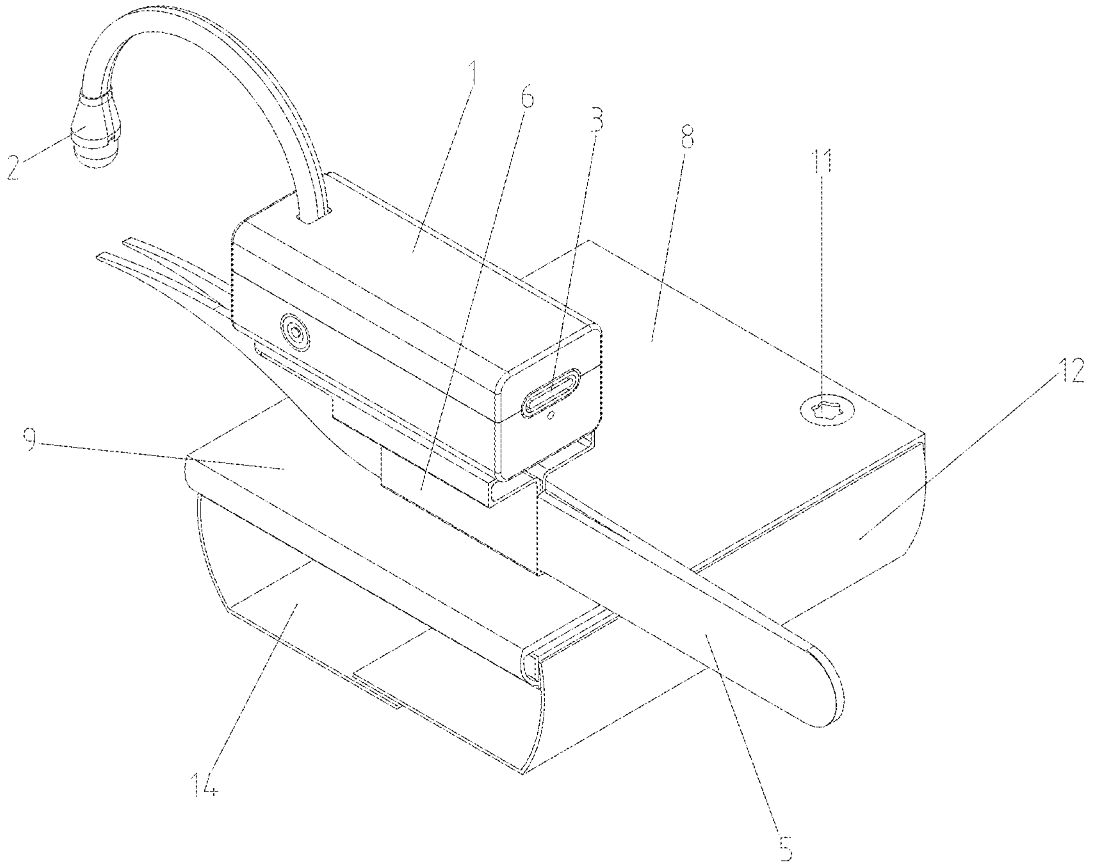
FIG. 1 is a schematic diagram of an external structure of the present disclosure.
Figure 2:
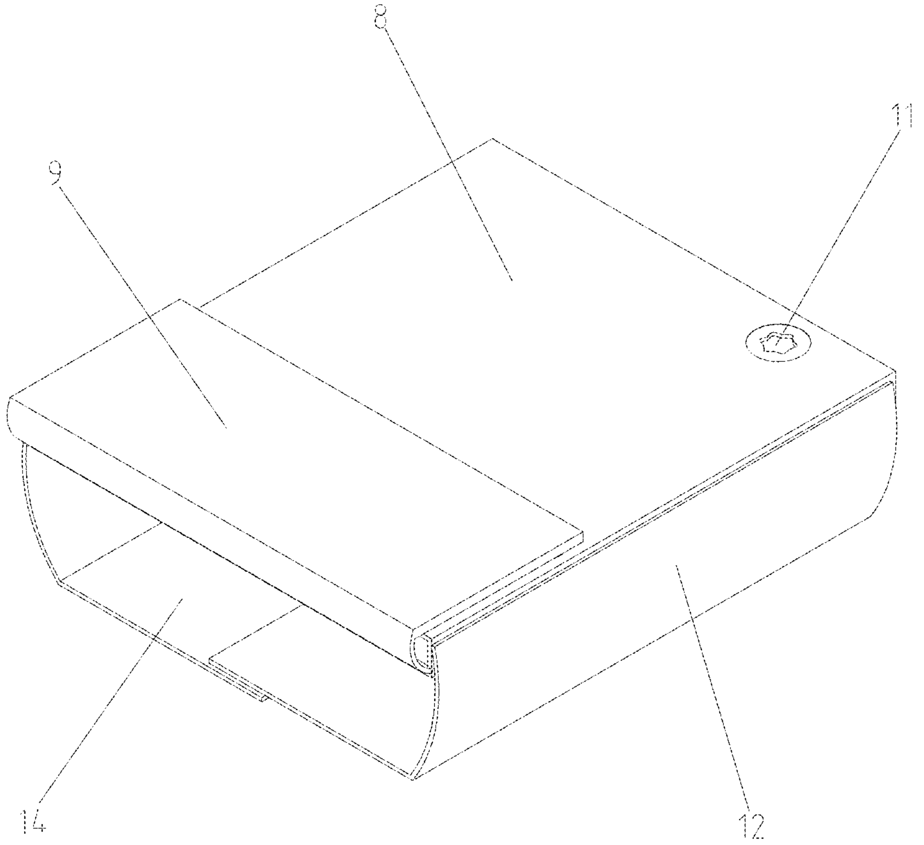
FIG. 2 is a schematic structural diagram of connection between a connecting strap I and a connected strap II of the present disclosure.
Figure 3:
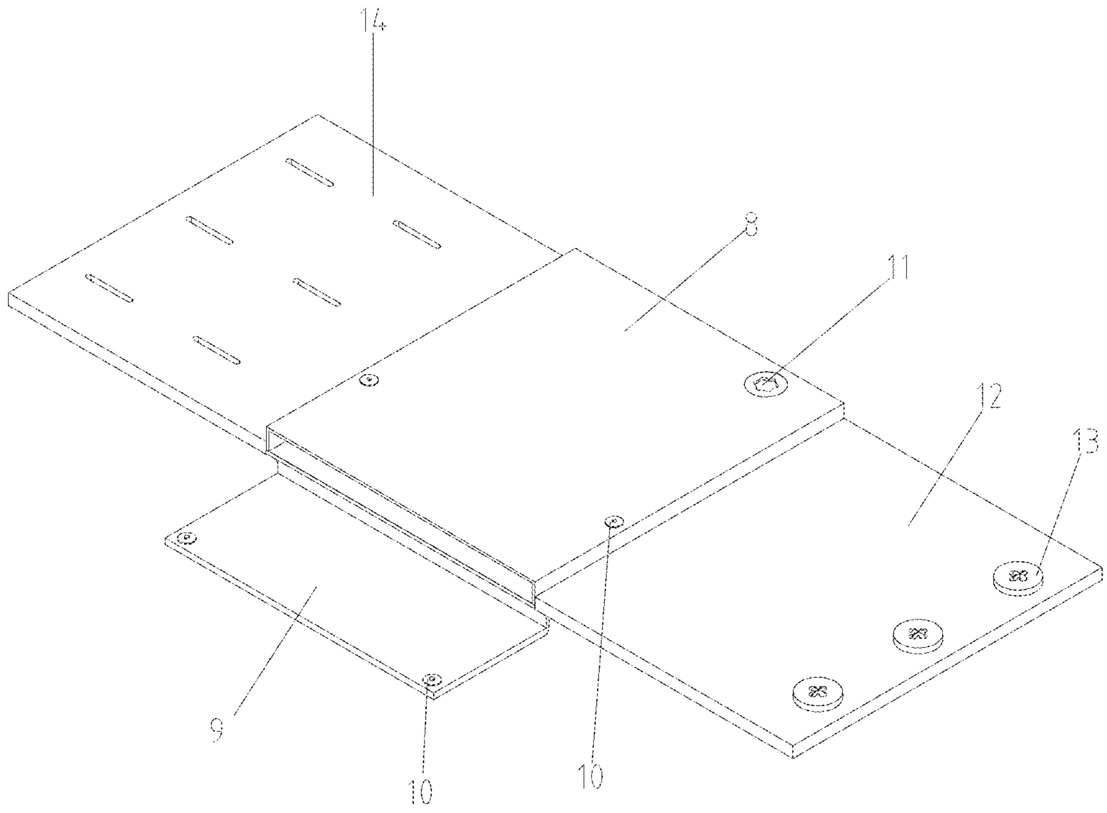
FIG. 3 is a schematic structural diagram of tiling of a connecting strap I and a connected strap II of the present disclosure.

In the drawings: 1: base box; 2: LED lamp; 3: charging port; 4: battery; 5: tweezer; 6: elastic clip; 7: magnet; 8: cloth bag; 9: bag cover; 10: connecting button; 11: wire opening; 12: connecting strap I; 13: adjustment button; and 14: connecting strap II.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some embodiments of the present disclosure, rather than all of the embodiments. All other embodiments obtained by a person of ordinary skill in the art based on the embodiments of the present disclosure without making creative efforts shall fall within the protection scope of the present disclosure.

Referring to FIG. 1 to FIG. 6, the present disclosure provides a technical solution: An easy-to-wear eyelash extension lamp includes a base box 1, an LED lamp 2, a charging port 3, a battery 4, a tweezer 5, an elastic clip 6, magnets 7, a cloth bag 8, a bag cover 9, a connecting button 10, a wire opening 11, a connecting strap I 12, an adjustment button 13, and a connecting strap II 14.

The device has an effect of clamping and fixing the tweezer. Specifically:

A remote control receiving electronic circuit is arranged inside the base box 1; the remote control receiving electronic circuit inside the base box 1 is connected to a remote control foot switch; an upper surface of the base box 1 is connected to the LED lamp 2; the LED lamp 2 uses a 410 nm nano LED; the charging port 3 is provided on one side of the base box 1; the charging port 3 is connected to the battery 4 through a wire; the tweezer 5 is arranged below the base box 1; a clamping structure is arranged on a lower surface of the base box 1; and the clamping structure is provided with the elastic clip 6 to clamp and fix the tweezer 5. The clamping structure includes the elastic clip 6; the elastic clip 6 is made of a stainless steel material; two clamping plates with different lengths are arranged below the elastic clip 6; a cross section of one clamping plate of the elastic clip 6 is L-shaped; upper ends of the two clamping plates of the elastic clip 6 are connected to a surface of the same connector; and a cross section of the elastic clip 6 is of a hollow T-shaped structure. Two magnets 7 are symmetrically arranged on an upper surface of the battery 4.

Figure 4:
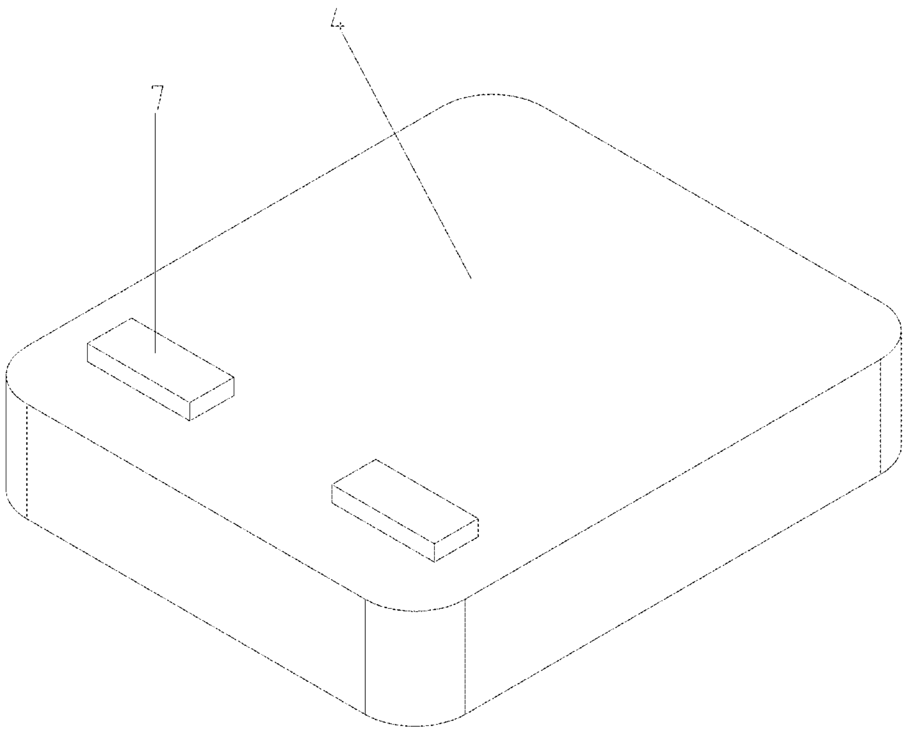
FIG. 4 is a schematic structural diagram of a battery and magnets of the present disclosure.
Figure 5:
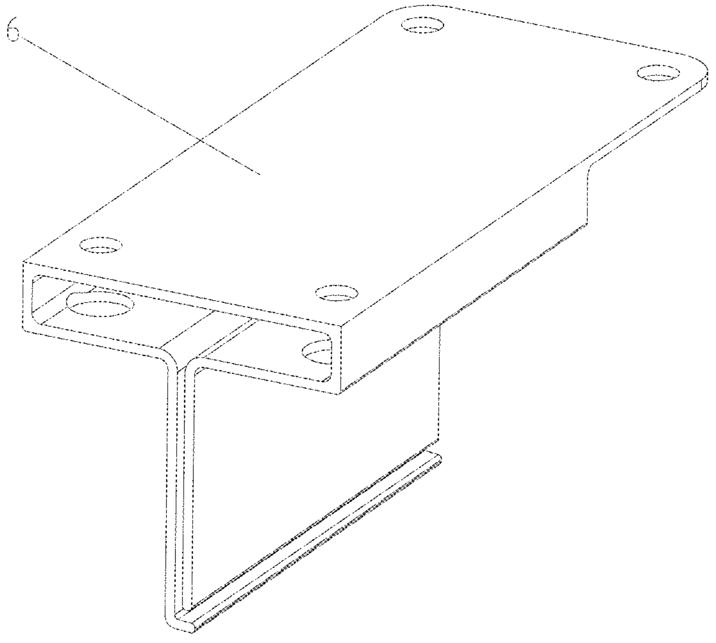
FIG. 5 is a schematic structural diagram of an elastic clip of the present disclosure.
Figure 6:
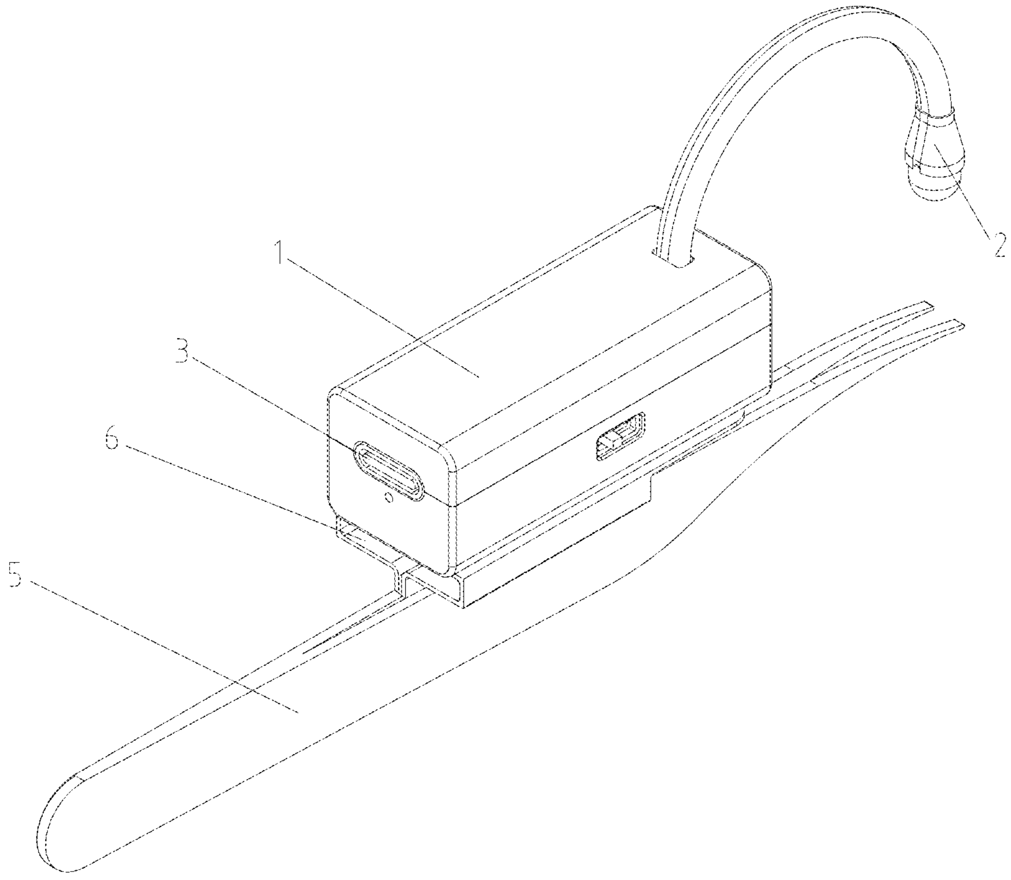
FIG. 6 is a schematic structural diagram of connection between an elastic clip and a tweezer of the present disclosure.

As shown in FIG. 1, FIG. 4, and FIG. 5, when the device is used, the remote control receiving electronic circuit in the base box 1 is used to receive a wireless signal, and the remote control foot switch is used to control the LED of the LED lamp 2 to be on and off. One edge of the tweezer 5 is inserted between the two clamping plates below the elastic clip 6, so that the tweezer 5 is clamped by the elastic clip 6, thereby fixing the tweezer 5. To replace different tweezers 5, one tweezer 5 is pulled outwards, and the other tweezer 5 is inserted into the elastic clip 6, so that the tweezers 5 can be quickly replaced. The tweezer 5 and the LED lamp 2 can be separated for use. When it is not necessary to use the tweezer 5, the tweezer 5 is removed from the elastic clip 6, and the LED lamp 2 is used alone. An upper surface of the elastic clip 6 is connected to a lower surface of the base box 1, so that when a user holds the tweezer 5 for operation, the base box 1 and the LED lamp 2 move synchronously with the tweezer 5 to quickly cure glue used in the eyelash extension process. If a built-in power supply of the LED lamp 2 runs low, the LED lamp can be connected to the battery 4 for charging, and the LED lamp can be used when being charged. When the device is not in use, the device can be magnetically sucked onto the wrist using the magnets 7.

The device has a quick wearing effect. Specifically:

A wearing structure is arranged below the base box 1; and the wearing structure is provided with a cloth bag 8 configured to store the battery 4 and facilitate the device to be worn on the wrist of an operator. The wearing structure includes the cloth bag 8; the cloth bag 8 is made of an elastic material; one side of the cloth bag 8 is of an open structure; the open side of the cloth bag 8 is sewn and connected with a bag cover 9; connecting buttons 10 are separately arranged on a surface of the bag cover 9 and a surface of the cloth bag 8; and the connecting buttons 10 are of press button structures. A wire opening 11 is provided on a surface of the cloth bag 8; the wire opening 11 is a circular hole penetrating through the surface of the cloth bag 8; and an elastic rope structure is arranged on an inner wall of the wire opening 11. One side of the cloth bag 8 is sewn and connected with a connecting strap I 12, and the other side of the cloth bag 8 is sewn and connected with a connecting strap II 14; the connecting strap I 12 and the connecting strap II 14 both use the same elastic fabric as the cloth bag 8; three adjustment buttons 13) are arranged on a surface of the connecting strap I 12 in parallel; and a plurality of groups of parallel elongated button holes are provided on a surface of the connecting strap II 14.

As shown in FIG. 1, FIG. 2, FIG. 3, and FIG. 6, the battery 4 is inserted from the open side of the cloth bag 8; and the bag cover 9 and the cloth bag 8 are connected using the connecting buttons 10, so that the battery 4 is stored in the cloth bag 8. The wire can be inserted into the cloth bag 8 for being connected to the battery 4 by using the wire opening 11 on the surface of the cloth bag 8; and the adjustment buttons 13 are used to connect the button holes on the surfaces of both the connecting strap I 12 and the connecting strap II 14, so that the connecting strap I 12 and the connecting strap II 14 are connected. After the connection is completed, the elastic connecting strap I 12 and connecting strap II 14 are used to sleeve the wrist, so that the device is worn on the wrist. The connection positions of the adjustment buttons 13 can be adjusted using the plurality of groups of parallel button holes, thus adjusting the connection lengths of the connecting strap I 12 and the connecting strap II 14 to adapt to the widths of the wrists of different users.

Working principle: When the easy-to-wear eyelash extension lamp is used, the elastic clip 6 on the lower surface of the base box 1 can be used to clamp and fix the tweezer 5, and it is convenient for the elastic clip 6 to quickly replace different tweezers 5. The cloth bag 8 is arranged below the base box 1 to store the battery 4. The magnets 7 are arranged on the upper surface of the battery 4. The magnets 7 can be used to magnetically suck the tweezer 5 and the base box 1 onto the surfaces of the magnets 7, so that the device is magnetically sucked onto the wrist. The connecting strap I 12 and the connecting strap II 14 are arranged on the two sides of the cloth bag 8. The device can be fast worn on the wrist of a user due to the connection between the connecting strap I 12 and the connecting strap II 14. This improves the overall practicability.

Although the embodiments of the present disclosure have been shown and described, it can be understood by those of ordinary skill in the art that various changes, modifications, substitutions, and variations can be made to these embodiments without departing from the principle and spirit of the present disclosure. The scope of the present disclosure is defined by the accompanying claims and their equivalents.

What is claimed is:

1. An easy-to-wear eyelash extension lamp, comprising a base box (1), wherein a remote control receiving electronic circuit is arranged inside the base box (1); the remote control receiving electronic circuit inside the base box (1) is connected to a remote control foot switch; an upper surface of the base box (1) is connected to a light-emitting diode (LED) lamp (2); the LED lamp (2) uses a 410 nm nano LED; a charging port (3) is provided on one side of the base box (1); the charging port (3) is connected to a battery (4) through a wire; a tweezer (5) is arranged below the base box (1); a clamping structure is arranged on a lower surface of the base box (1); and the clamping structure is provided with an elastic clip (6) to clamp and fix the tweezer (5).

2. The easy-to-wear eyelash extension lamp according to claim 1, wherein the clamping structure comprises the elastic clip (6); the elastic clip (6) is made of a stainless steel material; two clamping plates with different lengths are arranged below the elastic clip (6); a cross section of one clamping plate of the elastic clip (6) is L-shaped; upper ends of the two clamping plates of the elastic clip (6) are connected to a surface of the same connector; and a cross section of the elastic clip (6) is of a hollow T-shaped structure.

3. The easy-to-wear eyelash extension lamp according to claim 1, wherein two magnets (7) are symmetrically arranged on an upper surface of the battery (4).

4. The easy-to-wear eyelash extension lamp according to claim 1, wherein a wearing structure is arranged below the base box (1); and the wearing structure is provided with a cloth bag (8) configured to store the battery (4) and facilitate the device to be worn on the wrist of an operator.

5. The easy-to-wear eyelash extension lamp according to claim 4, wherein the wearing structure comprises the cloth bag (8); the cloth bag (8) is made of an elastic material; one side of the cloth bag (8) is of an open structure; the open side of the cloth bag (8) is sewn and connected with a bag cover (9); connecting buttons (10) are separately arranged on a surface of the bag cover (9) and a surface of the cloth bag (8); and the connecting buttons (10) are of press button structures.

6. The easy-to-wear eyelash extension lamp according to claim 4, wherein a wire opening (11) is provided on a surface of the cloth bag (8); the wire opening (11) is a circular hole penetrating through the surface of the cloth bag (8); and an elastic rope structure is arranged on an inner wall of the wire opening (11).

7. The easy-to-wear eyelash extension lamp according to claim 4, wherein one side of the cloth bag (8) is sewn and connected with a connecting strap I (12), and the other side of the cloth bag (8) is sewn and connected with a connecting strap II (14); the connecting strap I (12) and the connecting strap II (14) both use the same elastic fabric as the cloth bag (8); three adjustment buttons (13) are arranged on a surface of the connecting strap I (12) in parallel; and a plurality of groups of parallel elongated button holes are provided on a surface of the connecting strap II (14).

* * * * *